US008116285B1

(12) United States Patent
Barnum

(10) Patent No.: US 8,116,285 B1
(45) Date of Patent: Feb. 14, 2012

(54) INTELLIGENT WIRELESS ACCESS POINT SELECTION

(75) Inventor: Walter Barnum, Salt Lake City, UT (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2673 days.

(21) Appl. No.: 10/246,827

(22) Filed: Sep. 19, 2002

(51) Int. Cl.
*H04W 4/00* (2009.01)
(52) U.S. Cl. ........................................ 370/338
(58) Field of Classification Search .......... 370/328–339; 455/436–443
See application file for complete search history.

(56) References Cited

U.S. PATENT DOCUMENTS

| 5,461,627 | A | * | 10/1995 | Rypinski | 370/346 |
| 5,726,984 | A | * | 3/1998 | Kubler et al. | 370/349 |
| 5,815,811 | A | * | 9/1998 | Pinard et al. | 455/434 |
| 6,249,516 | B1 | * | 6/2001 | Brownrigg et al. | 370/338 |
| 6,332,077 | B1 | * | 12/2001 | Wu et al. | 455/432.1 |
| 6,522,881 | B1 | * | 2/2003 | Feder et al. | 455/437 |
| 6,526,034 | B1 | * | 2/2003 | Gorsuch | 370/338 |
| 6,580,700 | B1 | * | 6/2003 | Pinard et al. | 370/332 |
| 6,985,465 | B2 | * | 1/2006 | Cervello et al. | 370/333 |
| 7,143,171 | B2 | * | 11/2006 | Eriksson et al. | 709/227 |

OTHER PUBLICATIONS

Papanikos et al, "A Study on Dynamic Load Balance for IEEE 802.11b Wireless LAN," Proc. 8th International Conference on Advances in Communication & Control, COMCON 8, Rethymna, Crete/Greece, pp. 1-7, Jun. 2001.*

* cited by examiner

*Primary Examiner* — Frank Duong

(57) ABSTRACT

A method or system of enabling a wireless client device to select an access point based on at least two performance related parameters. A performance related parameter is a measurement of how efficiently a particular access point transfers data. By selecting an access point based on more than one performance related parameter, a wireless client device is more likely communicate with the most efficient access point. In addition, the wireless network as a whole will be more balanced and have a greater capacity if each of the wireless client devices is connected to the access point that provides the most efficient communications.

13 Claims, 3 Drawing Sheets

INTELLIGENT WIRELESS ACCESS POINT SELECTION

BACKGROUND OF THE INVENTION

1. The Field of the Invention

This invention relates generally to the field of computer networking. In particular, embodiments of the present invention relate to systems and methods for identifying and connecting with the most efficient wireless access point.

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network. Historically, a majority of installed networks utilize a wire-based communications medium. That is, the interconnections between computers and peripherals are accomplished with elaborate wire and cable-based connection systems. Depending on the size and type of network involved, the cost, installation, maintenance and upgrading of such networks is quite complex and requires sophisticated skills. Moreover, even the physical space needed for today's wire-based network systems can be prohibitive.

One solution to some of the drawbacks of wire-based connections is the use of short range wireless communication schemes to interconnect computers and computer peripherals within a network. The use of wireless communications provides a number of advantages, including the elimination of complex, expensive, and inconvenient wire and cable-based connections. A number of wireless communications standards have been developed for such applications; two popular examples are known as IEEE 802.11 and "Bluetooth." Both standards use low power radio frequencies to allow communication between various devices such as mobile phones, laptop and desktop computers, printers, modems, PDAs, and the like.

One of the main drawbacks of wireless networking is the limited transfer rate of wireless network connections compared to wired network connections. Because of this limited transfer rate it is important to maximize the efficiency and reliability of data transfers between wireless devices. The data transfer rate is slowed if the wireless signal is interrupted or disconnected between two wireless devices. Wireless devices only have a specific range and therefore if a user moves out of range the wireless signal between the user's device and another device may be interrupted or disconnected. To ensure that a signal is not interrupted within a specific area, most commercial wireless networks incorporate multiple access points with overlapping coverage areas to ensure that there are no dead spots within the network in which a user would be cut off from the network. The limited transfer rate is further slowed when there is an overflow of data traveling through one particular wireless device such as a wireless access point. The problem of overflow is commonly resolved by simply increasing the overall capacity of the network such as by using access points that are configured to communicate with multiple appliances at one time. This solution is expensive and still causes an inordinate amount of data to be transferred through a single access point while other access points remain underutilized.

Therefore, there is a need for a solution to these and other problems associated with the connection scheme used between wireless devices. In particular, it would be an advancement to provide a solution that ensures that every wireless device within a wireless network is communicating in the most efficient manner possible. Therefore, when a wireless device is given a choice to connect with one of a plurality of different access points, it should connect with the most efficient access point. Preferably, the configuration would be substantially automatic and transparent to the user, and occurs in a manner that does not require significant software resources to be downloaded to the computing device client. Moreover, such an approach would not require any specialized skills or knowledge on the part of the user.

SUMMARY OF PREFERRED EMBODIMENTS

These and other problems in the prior art, namely problems associated with the inefficient selection of an access point by a wireless client device, are addressed by embodiments of the present invention. Embodiments of the invention pertain to systems and methods for enabling a wireless client device to select an access point based on at least two performance related parameters. A performance related parameters is a measurement of how efficiently a particular access point transfers data with a wireless client device. By selecting an access point based on more than one performance related parameter, a wireless client device is more likely communicate with the most efficient access point. In addition, the wireless network as a whole will be more balanced and have a greater capacity if each of the wireless client devices is connected to the access point that provides the most efficient communications.

In one presently preferred embodiment, a method of enabling a wireless client device to select an access point based at least two performance related parameters follows a logical flow. Initially the wireless client device performs a scan to determine how many access points are within range. If there is only one access point within range it simply connects with that access point or maintains its current connection with that access point and then repeats the logical flow. If there are multiple access points within range, the wireless client device performs a pre-authenticating procedure with all of the available access points. The pre-authenticating procedure allows the wireless client device to measure certain performance related parameters about the access point. The wireless client device is also able to measure other performance related parameters without the pre-authenticating procedure. The wireless client device then analyzes and compares all of the performance related parameters to determine which access point to select. The actual algorithm used to select the most efficient access point is based on a weighting scheme in which certain performance related parameters are weighted higher than others. If the selected access point is already connected to the wireless client device, it will simply maintain that connection and then repeat the logical flow. However, if the selected access point is not connected to the wireless access point, it will connect with the new access point and then repeat the logical flow.

Thus, the present invention provides a number of benefits and advantages over the prior art by enabling a wireless client device to intelligently select an access point to associate or connect with based on at least two performance related parameters rather than just one. The wireless client device is therefore more likely to associate or connect with an access point that provides the most efficient data communication route. Whereas the prior art method of only relying on one performance related parameter is likely to select a less efficient access point that may be overburdened or unreliable. The proper selection of an access point by each wireless client device in turn results in the entire wireless network being utilized in a more productive and efficient manner. Consequently, a wireless network will increase its overall wireless client device capacity by being able to efficiently communicate with more wireless clients.

The foregoing, together with other features and advantages of the present invention, will become more apparent when referred to the following specification, claims and accompanying drawings.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates a logical flow chart illustrating one method for a wireless client device to determine the most efficient access point to associate with.

DETAILED DESCRIPTION OF PREFERRED EMBODIMENTS

Figure 1:
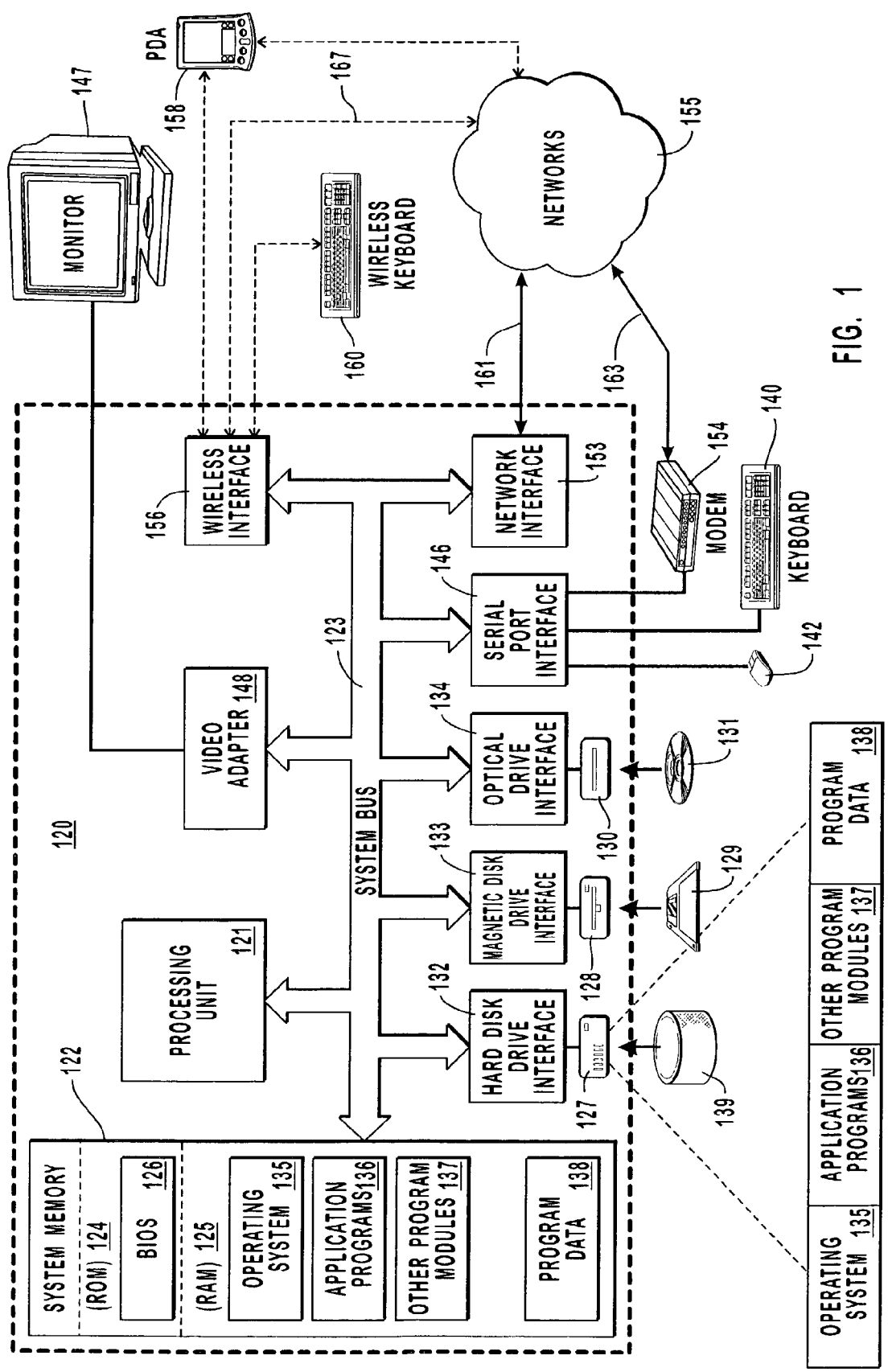
FIG. 1 illustrates an exemplary processing system that provides a suitable operating environment for embodiments of the present invention.

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to systems and methods that enable a wireless client device or wireless device to select the most efficient available access point to communicate with. In most commercial wireless networking environments individual wireless devices communicate with other wireless devices through an access point rather than directly. This type of wireless network is commonly referred to as an infrastructure mode network rather than an Ad Hoc network. Infrastructure mode networks increase coverage by requiring that all communications pass through an access point. For example, if one wireless device is 20 feet east of an access point and another wireless device is 20 feet west of an access point, it may be impossible for the wireless devices to communicate directly with one another but by communicating through an access point, the coverage area is significantly increased. In presently preferred embodiments, the wireless devices utilize a method of selecting the most efficient access point based on at least two performance related parameters. In many infrastructure mode networks, the access points generate overlapping coverage to ensure there are no dead spots within a particular area. Therefore, when a wireless device is in an overlapping coverage area it is possible to connect with more than one access point.

Preferred embodiments of the system and method provide a number of advantages not previously available with prior art solutions. In particular, the approach greatly increases the efficiency of communications between a wireless device and an access point because the wireless device will only connect with the access point that provides the most efficient form of communication. Likewise, this ensures that the entire wireless network is properly balanced such that there is no inefficient congestion points within the network. Embodiments of the invention select the most efficient access point by analyzing at least two performance related parameters. The performance related parameters pertain to characteristics of how the particular access point communicates with a new wireless device.

For example, in one implementation scenario, a personal digital assistant (PDA) with a wireless network interface device may be located in an overlapping coverage area of a infrastructure mode wireless network. The PDA therefore can connect to the network via two or more access points. The PDA would perform a method of selecting one of the access points based on at least two performance related parameters such as signal strength and signal quality. The PDA then connects to the network via the selected access point but continually scans to determine if another access point would provide a more efficient means of connecting to the network. In the past, the PDA would simply connect with the access point based on a single performance related parameter, wherein the single performance related parameter was almost always the signal strength. By connecting with the access point with the highest signal strength, the PDA generally connects with the closest access point. Unfortunately, as will be described in greater detail below, the closest access point in an infrastructure mode wireless network is not always the most efficient means of connecting with the network.

While embodiments of the present invention are described in the context of particular wireless network environments and configurations, such descriptions are for illustration purposes only and should not be viewed as limiting of the invention. Indeed, the capabilities described would find application in a myriad of network environments and network applications.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc.

that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

FIG. 1 illustrates an example system for implementing embodiments of the invention that includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to any one of a number of different network resources, such as other remote computers, which may be personal computers, servers, routers, network PCs, peer devices or other common network nodes, and typically include many or all of the elements described above relative to the computer 120. Such computing devices may also provide a variety of network resources, such as various applications. As is well known, other network resources may be present on the network, such as printers, modems, facsimile machines, other network equipment (switches, hubs, access points, etc.) and the like.

Examples of various logical connections to network 155 are depicted in FIG. 1 include a wireless network 167, a local area network (LAN) 161, and a wide area network (WAN) 163. Each of the logical connections 167, 161, 163 represent a different way for the computer 120 to connect to the network 155. Moreover, actual connection to the corresponding network is facilitated by a network interface device operatively connected to the computer. For example, the wireless network 167 may utilize radio frequencies, microwaves, infrared light, etc. to transmit signals via the wireless interface 156 to the network 155. Connection to the LAN 161 is accomplished via a hard-wired network interface device, such as that represented at network interface 153. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of further example, the wireless interface 156 could be implemented as a short range radio transceiver that preferably utilizes low power radio frequencies to transmit information over relatively short distances. For example, the wireless interface 156 could be implemented as a Bluetooth or an 802.11 radio transceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented in accordance with the 802.11 wireless standard. As such, the 802.11 transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the 802.11 module itself (e.g., 156 in FIG. 1).

Figure 2:
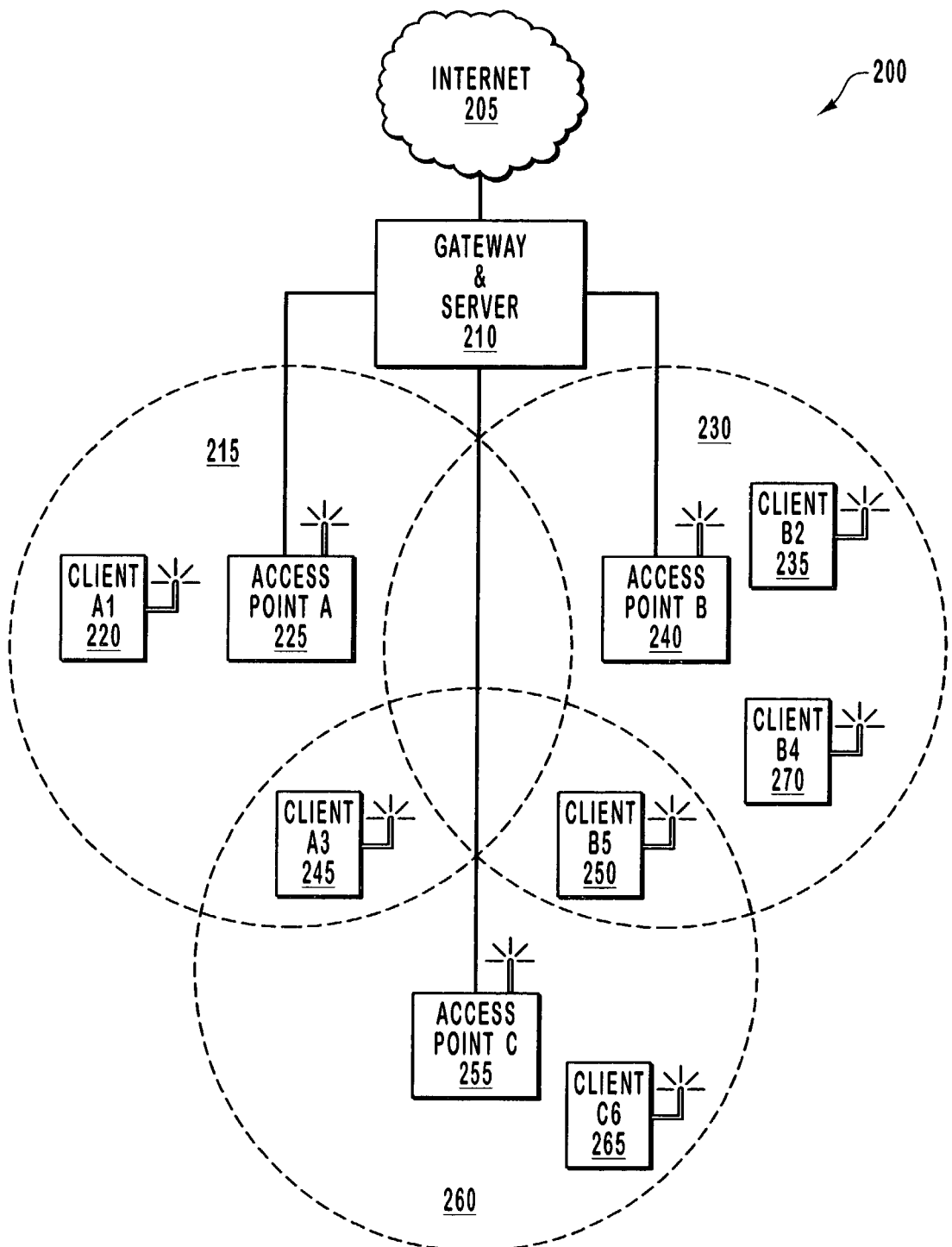
FIG. 2 illustrates a schematic representation of a wireless computer network environment in which presently preferred embodiments of the invention find application.

Reference is next made to FIG. 2 which illustrates a schematic representation of a wireless computer network environment, designated generally at 200. The illustrated wireless network is referred to as an infrastructure mode network because all wireless data transfers pass through one of the access points rather than traveling directly between the wireless client devices. The network 200 further includes a gateway & server 210 connected to the internet 205. The gateway & server 210 is a computer device including a processor and multiple networking interfaces. The gateway & server 210 is connected to the internet 205 via a high speed internet portal such as a T1, T2, T3, DSL, Cable modem, Broadband, etc. The gateway & and server 210 is also connected to access point A 225, access point B 240, and access point C 255 via a wired high speed data connection. Alternatively, the gateway & server 210 could be connected to the access points 225, 240, 255 over a wireless air interface but wired connections are generally more efficient at transferring large amounts of data. The main purpose of the gateway & server 210 is to control the flow of data between the access points 225, 240, 255 and the internet 205. Each of the access points 225, 240, 255 are configured to convert electrical data signals into wireless data signals and vice versa. The electrical data signals and the wireless data signals conform to particular data formats and require specific components to decode and encode the data. As shown in FIG. 1, the network interface 153 allows the computer 120 to communicate with the networks 155 over a wired connection. In FIG. 2, the access points 225, 240, 255 and the server & gateway 210 would all include some form of network interface such as an Ethernet NIC card to allow them to communicate with one another over the wired connection. The electrical signals transferred on the wired connection between the gateway & server 210 and the access points 225, 240, 255 conform to an Ethernet data format and the wireless data signals transmitted and received by the access points 225, 240, 255 conform to an 802.11 data format. Naturally, it is within the scope of this invention for the electrical or wireless data formats to be different.

The access points 225, 240, 255 each generate a coverage area in which wireless data signals can be transferred to and from the access points 225, 240, 255. In infrastructure mode wireless networks it is common for the coverage areas of multiple access points to overlap to ensure that there are no dead spots within the area. Access point A 225 generates a first coverage area 215 which includes wireless client device A1 220 and wireless client device C3. Access point B 240 generates a second coverage area 230 which includes wireless client device B2 235, wireless client device B4 270 and wireless client device B5 250. Access point C 255 generates a third coverage area 260 which includes wireless client device C3 245, wireless client device B5 250 and wireless client device C6 265. A wireless client device is defined as a device that is capable of at least receiving data signals over a wireless air interface. A wireless client device may be but is not limited to a laptop computer, a desktop computer, a personal digital assistant (PDA), a cell-phone, a wireless printer, a wireless keyboard, a wireless audio speaker, etc. The access points 225, 240, 255 communicate with the wireless client devices over the wireless air interface. The access points 225, 240, 255 and each of the wireless client devices 220, 245, 235, 250, 270, 265 include a wireless network interface device that is configured to transmit and receive wireless data signals. The wireless interface incorporated into the wireless client devices and the access points is analogous to the wireless interface 156 illustrated in FIG. 1 to allow the computer 120 to communicate with the networks 155. In this embodiment, the access points 225, 240, 255 and the wireless client devices 220, 245, 235, 250, 270, 265 each include an IEEE 802.11 wireless network interface device that allows them to communicate using a special IEEE 802.11 radio frequency data format. The illustrated coverage areas 215, 230, 260 are not drawn to scale nor are they necessarily representative of the pattern generated by an access point. The illustrated coverage areas 215, 230, 260 are merely examples to show overlapping wireless coverage areas in a wireless network.

A single wireless client device can only communicate with an access point if it is within the coverage area corresponding to a particular access point. For example, wireless client device A1 220 can only communicate with access point A 225 because the wireless client device A1 220 is physically located in the coverage area of access point A 225 only. Whereas, wireless client device A3 245 can communicate with either access point A 225 or access point C 255 because it is physically located in the coverage areas pertaining to both access point A 225 and access point C 255. Therefore, wireless client device A3 245 has a choice as to which access point it wishes to communicate with. In most existing wireless clients, the wireless client will connect with the access point that generates the largest signal strength. The signal strength is essentially the amplitude of the wireless signal that is transmitted from the access point to the wireless client. If there are no barriers between the wireless client and the access point, the signal strength will be directly proportional to the distance between the access point and the wireless client device. However, if there is a barrier, the signal strength may be significantly lower. If all wireless clients in an infrastructure network are configured to merely connect with the access point that has the highest signal strength, it is unlikely that all of the access points will be efficiently utilized. For example, wireless client device B5 250 has a choice to connect to either access point B 240 or access point C 255. If wireless client device B5 250 is incrementally closer to access point B 240 and is equipped with a conventional wireless access point selection scheme, it will choose to connect with wireless access point B 250 because it will most likely have a slightly higher signal strength. Access point B 240 already has two existing wireless client devices and wireless access point C 255 only has one existing client device. Therefore, access point B 240 will most likely operate slower than access point C 255. If this scenario is multiplied numerous times, it is evident that when a wireless client device only selects the access point to connect with based on signal strength, it underutilizes the network resources and unnecessarily slows down the data transfers on one or more congested access points.

The method and systems of the present invention include configuring one or more of the wireless client device to select an access point based on at least two performance related parameters. The exact algorithm or criteria that is used to select a particular access point based on the at least two performance related parameters is based on an input from a user interface device, is hard-coded into the wireless client device, or is automatically configured by a network administrator for the particular wireless network. For example, if the wireless client device is a PDA, the PDA may prompt the user to enter a weighting scheme of the performance related parameters that will be used in selecting an access point if there is more than one available access point to connect with. It may be advantageous to have the criteria determined by a network administrator so that all wireless client devices within the same network utilize the same criteria.

The wireless signal strength is one performance related parameter but there are many others including but not limited to the effective quality of the link, the amount of network traffic handled by each access point, the amount of clients each access point is associated with, pre-association based data rate, pre-association based reliability, and historical data for a particular access point. The effective quality of the link is a measurement of how many data packets or messages appear to be corrupted that originate from a particular access point. This information can be obtained when a wireless client device eavesdrops on the data transmissions the particular access point has with an existing or associated wireless client device. The amount of network traffic handled by an access point is a measurement of how much data is transferred to and from the particular access point in question. For example, an access point may only be connected to one wireless client device, but that wireless client device may be conducting a high bandwidth activity such as listening to an internet radio station. The number of clients associated with a particular access point is a measurement of the number of wireless clients that are currently in exclusive communication with the particular access point in question. In most infrastructure mode wireless networks, individual wireless client devices choose one access point to associate or connect with and they are then assigned to that access point until they disassociate or disconnect. Although wireless client devices can only associate with one access point at a time, they can however pre-associate with multiple access points and gain information about the access point in the pre-association process. In a pre-association process a wireless client device may transfer and receive a certain amount of data with an access point. Various parameters can then be measured about the limited data flow between the wireless client device and the pre-associated access point. These parameters can then be used to infer the actual performance of the access point if the wireless client device was to actually associate or connect with the particular access point. The pre-association reliability is a measurement of how reliable the data transferred from the pre-associated access point is. Reliability pertains to corruption, improper data format, etc. The pre-association data rate is simply a measurement of how fast the pre-associated access point was able to transfer data to the wireless client device. Historical data is a record of the performance of the access point including multiple parameters. The historical data is generally stored on the access point itself and then requested by a wireless client device. This information can also be used to determine if a particular access point needs to be replaced or modified.

In preferred embodiments, this functionality in the wireless client devices is provided via a module for efficiently selecting the most efficient access point to communicate with. The module may be a software based module that resides on some form of data storage device or alternatively the module may be a hardware/firmware based module that is hard-coded into a microelectronic device connected to the wireless client device. The module may also be integrated within a wireless network interface device such as a IEEE 802.11 PCMIA network interface card.

Figure 3:
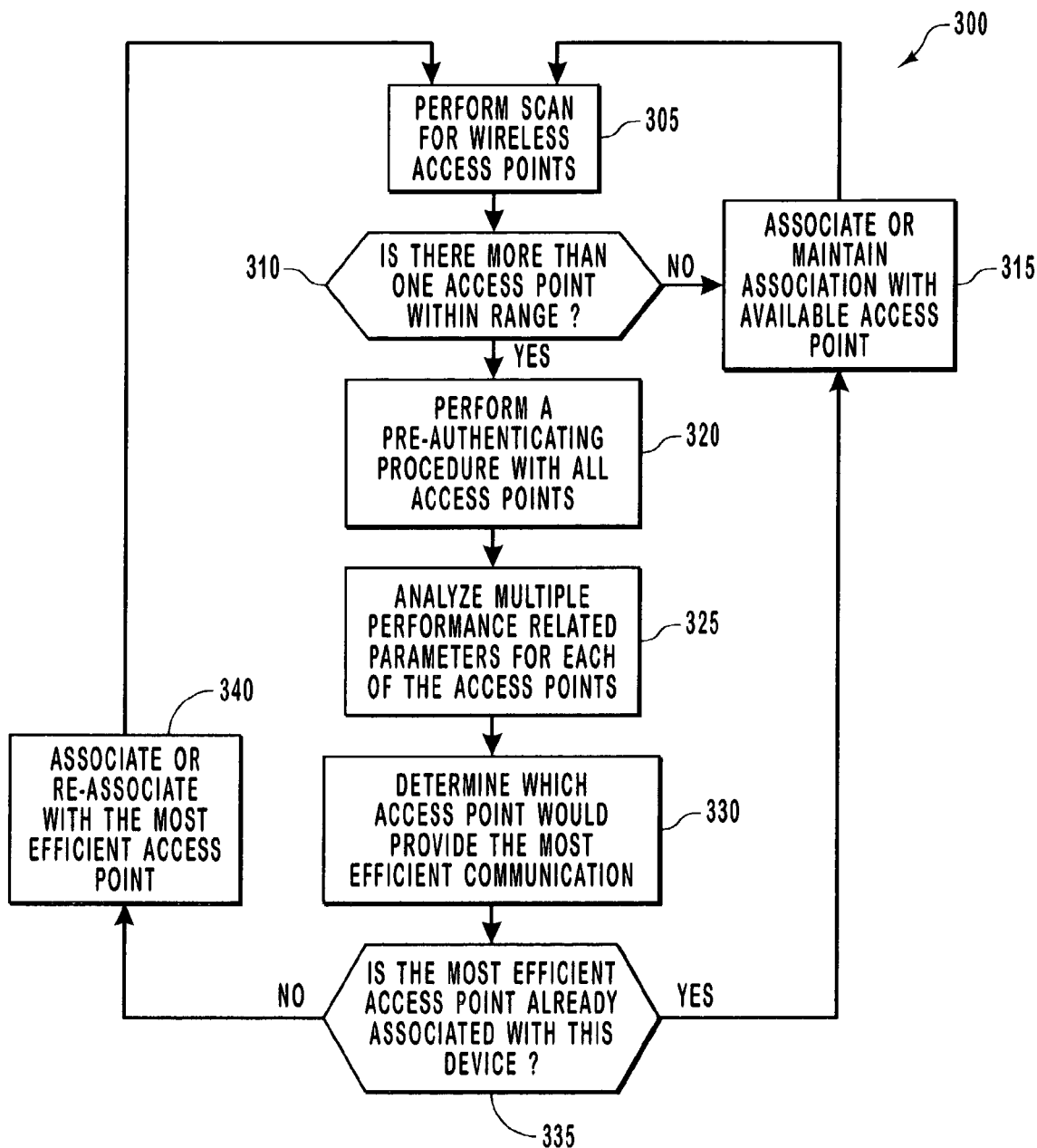

Reference is next made to FIG. 3 which illustrates a logical flow chart illustrating one method for a wireless client device to determine the most efficient access point to associate with, designated generally at 300. The following logical flow 300 is performed by a wireless client device before connecting with an access point within an infrastructure mode wireless network. For example, if a wireless client device travels into a particular coverage area, the wireless client device would utilize the logical flow 300 to determine how to connect to an access point. The logical flow 300 may also be performed if a user turns on a wireless client device that is located within the coverage area of at least one access point. The logical flow 300 initially performs a scan to determine if the wireless client device is within one or more coverage areas pertaining to one or more access points 305. The act of scanning for available access points further includes transmitting a wireless beacon that requests that all available access points respond. Alternatively, the wireless client device could simply listen for transmissions made by the various access points but this is unreliable because a particular access point may not be transmitting at that particular moment. An available access point is one that is capable of communicating or associating with the wireless client device. An access point that is locked or private but within range is not considered an available access point. The act of scanning further includes receiving an identification response from each of the available access points indicating that they are available to connect with. Based on the number of identification responses received by the wireless client device, the wireless client device is able to determine the number of available access points. The logical flow then analyzes if there is more than one access point within range (available access point) 310. If there is not more than one available access point, the wireless client device associates or maintains association with the available access point 315. If there is more than one available access point, the logical flow 300 proceeds to perform a pre-authenticating procedure with all available access points 320. As described above, a pre-authenticating procedure includes transferring and receiving a limited amount of data with a particular access point and then measuring the communication performance of the data that was received from the access point. By performing the pre-authenticating procedure, the wireless client device is then able to obtain many different types of performance related parameters about the access point. Other performance related parameters can be obtained without pre-authenticating with the access point. For example, a wireless client device can determine the signal strength of a particular access point without performing the pre-authenticating procedure by simply listening to its transmissions. The logical flow 300 then proceeds to require that the wireless client device analyze the multiple performance related parameters for each of the access points 325. The analysis includes organizing the performance related parameters for each of the different available access points. A wireless client device then determines which access point would provide the most efficient communications 330. This act of determining or selecting the most efficient access point further includes comparing the at least two performance related parameters for each access point and assigning a weighted value to each of the performance related parameters based on a predetermined criteria. As discussed above, the criteria for comparing the performance related parameters can be fixed, entered by a user, or entered by a network administrator and required of all wireless client devices in a particular network. Once all of the performance related parameters are weighted it is extremely easy to generate an overall score for each of the access points and simply select the access point with the highest score.

Alternatively, other methods of using the at least two performance related parameters to select an access point could be utilized such as simply comparing one of the at least two performance related parameters to decide which access point to select. The logical flow 300 then inquires whether the selected access point is already associated with the wireless network interface device 335. If the wireless network interface device is already associated with the selected access point, the logical flow maintains the association with the access point 315, and then reinitiates the logical flow 300 by scanning for available access points 305. If the wireless network interface device is not already associated with the selected access point, it associates or re-associates with the selected access point 340 and then reinitiates the logical flow 300 by scanning for available access points 305. A delay may be introduced between iterations of the logical flow 300 such that efficiency of communication is not reduced by constantly scanning for available access points.

In summary, the present invention provides a number of benefits and advantages over the prior art by enabling a wireless client device to intelligently select an access point to associate or connect with based on at least two performance related parameters rather than just one. The wireless client device is therefore more likely to associate or connect with an access point that provides the most efficient data communication route. Whereas the prior art method of only relying on one performance related parameter is likely to select a less efficient access point that may be overburdened or unreliable. The proper selection of an access point by each wireless client device in turn results in the entire wireless network being utilized in a more productive and efficient manner. Consequently, a wireless network will increase its overall wireless client device capacity by being able to efficiently communicate with more wireless clients.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a wireless client device, a method of selecting an access point comprising:
   scanning for available access points;
   if there are more than one available access point, performing the following acts:
      eavesdropping on the available access points to observe communications between the available access points and at least one wireless client device;
      determining at least two performance related parameters for each of the access points based upon the eavesdropping on the access points;
      selecting an access point, based on the at least two performance related parameters and a predetermined weighting criteria, which would provide the most efficient communications; and
   connecting with the selected access point.

2. The method of claim 1 wherein the at least two performance related parameters include a data transfer rate of the available access point.

3. The method of claim 1 wherein the at least two performance related parameters include reliability information of the available access point.

4. The method of claim 1 wherein the at least two performance related parameters include a locked parameter.

5. The method of claim 1 wherein the at least two performance related parameters include a private parameter.

6. The method of claim 1 wherein the at least two performance related parameters include historical data on the performance of communications with the wireless access point.

7. A wireless client device comprising:
   a wireless network interface device; and
   a module to select an efficient access point of a plurality of available access points to communicate with in a wireless network based on at least two performance related parameters determined through an eavesdropping process on the plurality of available access points using the wireless network interface device, wherein the eavesdropping process includes an observation of communications between the plurality of available access points and at least one wireless client device.

8. The wireless client device of claim 7 wherein the at least two performance related parameters include a data transfer rate of the available access point.

9. The wireless client device of claim 7 wherein the at least two performance related parameters include reliability information of the available access point.

10. The wireless client device of claim 7 wherein the at least two performance related parameters include a locked parameter.

11. The wireless client device of claim 7 wherein the at least two performance related parameters include a private parameter.

12. The wireless client device of claim 7 wherein the at least two performance related parameters include historical data on the performance of communications with the wireless access point.

13. In a wireless client device, a method of selecting an access point comprising:
   scanning for available access points;
   if there is more than one available access point, performing the following acts:
      eavesdropping on the access points;
      determining a performance related parameter for each of the access points based upon observation of communications between the available access points and one or more wireless client devices;
   selecting an access point, based on the performance related parameter which would provide efficient communications; and
   connecting with the selected access point.

* * * * *